March 23, 1965 W. D. VOELKER 3,174,887
METHOD OF PRODUCING A SANDWICH STRUCTURE
FROM A PAIR OF FOAM COATED SHEETS
Filed Oct. 12, 1959 4 Sheets-Sheet 1

INVENTOR.
Walter D. Voelker
BY John R. Eubank
ATTORNEY.

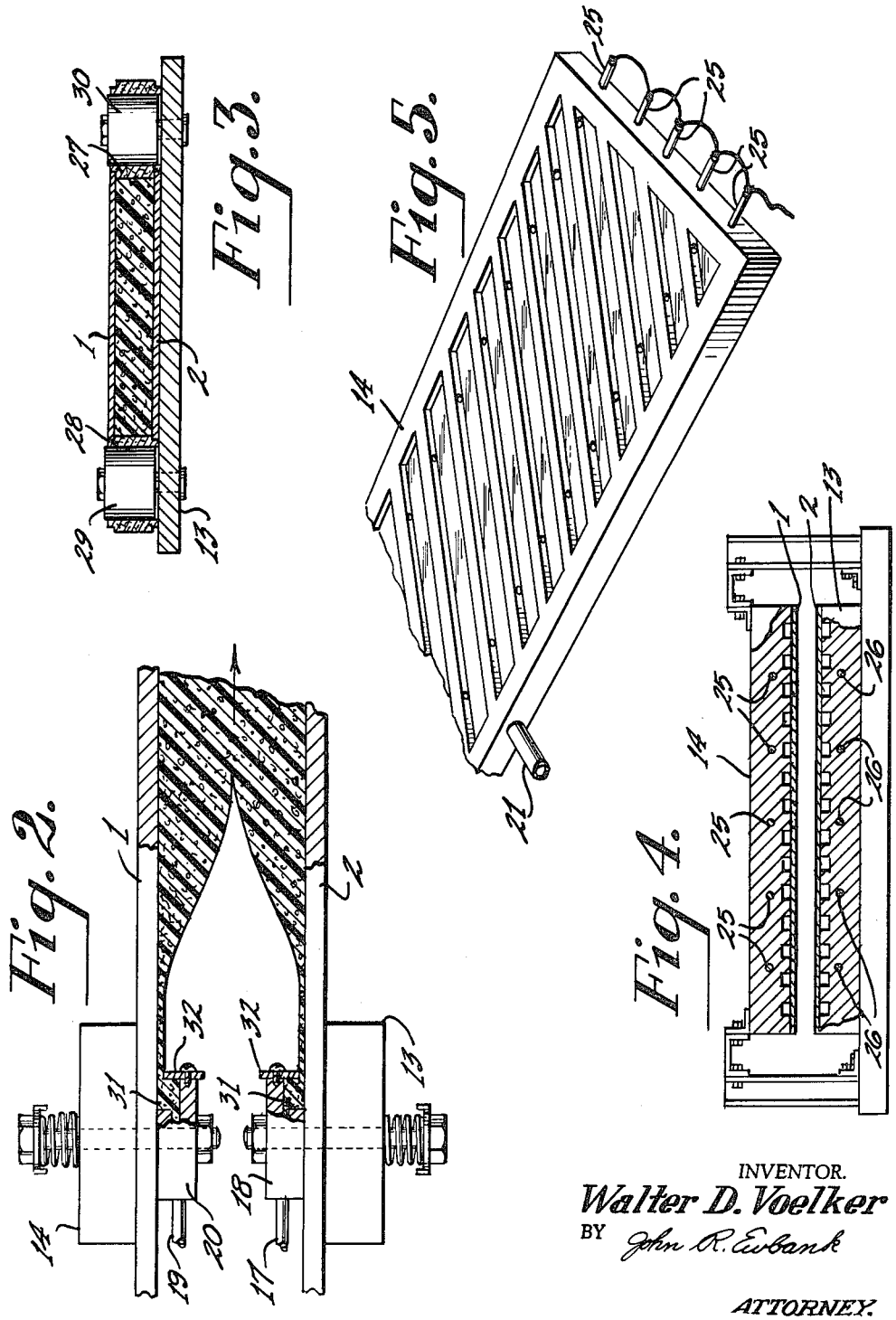

March 23, 1965 W. D. VOELKER 3,174,887
METHOD OF PRODUCING A SANDWICH STRUCTURE
FROM A PAIR OF FOAM COATED SHEETS
Filed Oct. 12, 1959 4 Sheets-Sheet 3
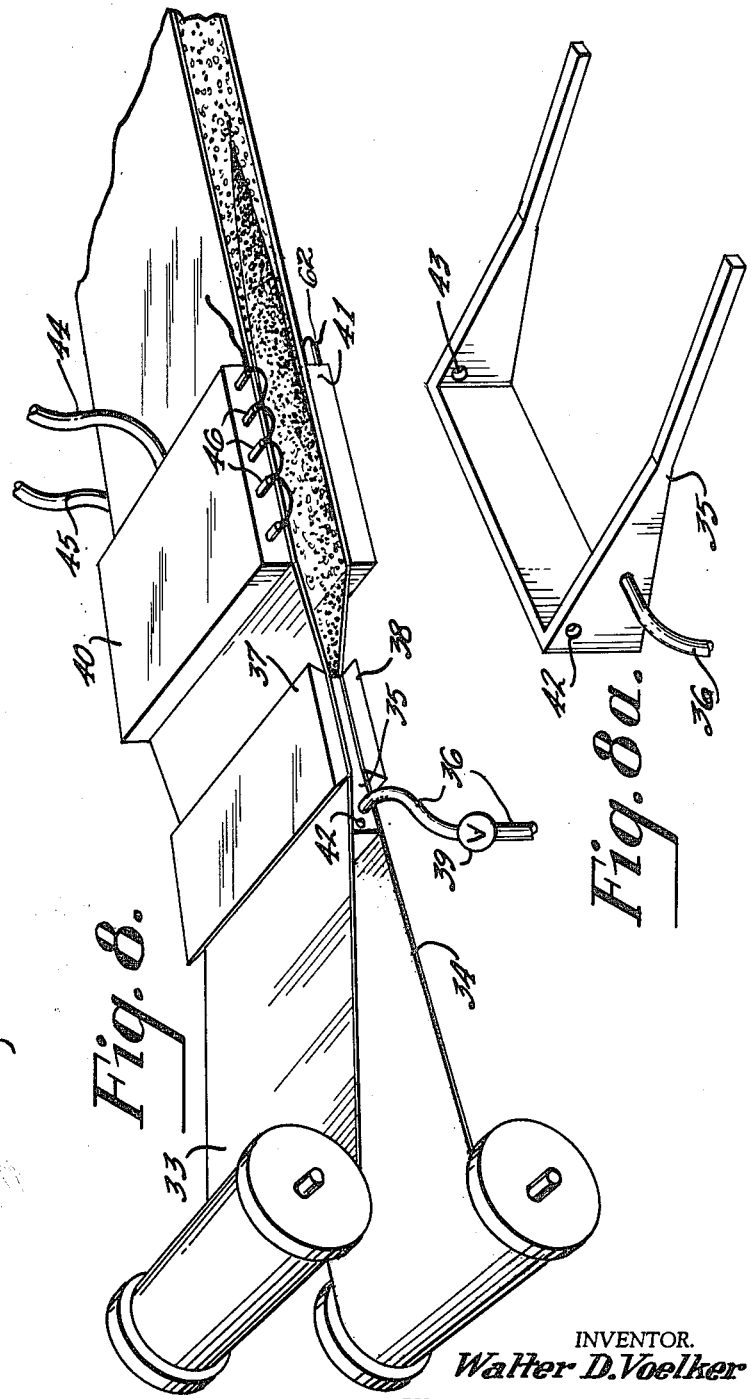
INVENTOR.
*Walter D. Voelker*
BY
*John R. Ewbank*
ATTORNEY.

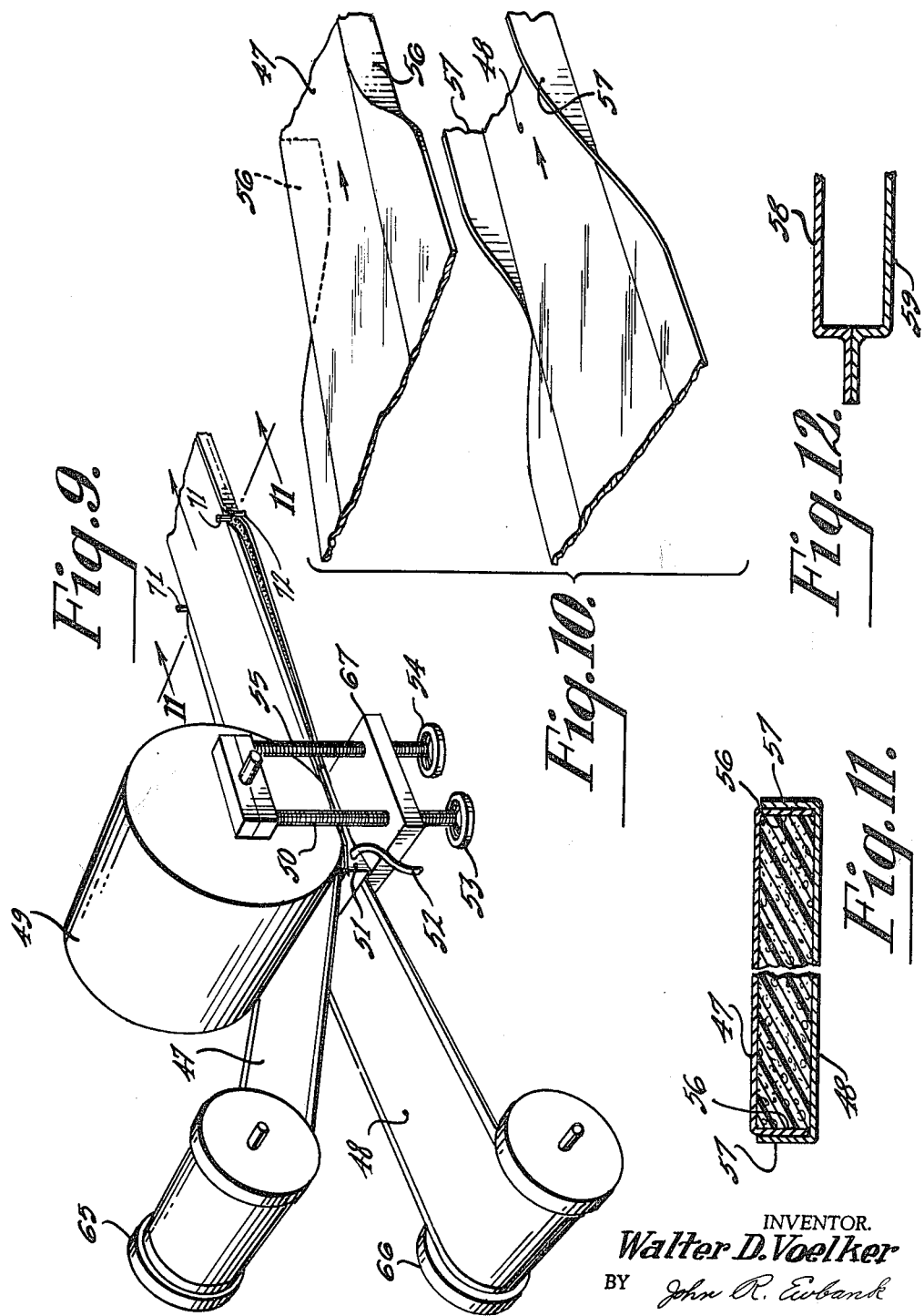

3,174,887
METHOD OF PRODUCING A SANDWICH STRUCTURE FROM A PAIR OF FOAM COATED SHEETS

Walter D. Voelker, Philadelphia, Pa., assignor to Union Carbide Corporation, New York, N.Y., a corporation of New York
Filed Oct. 12, 1959, Ser. No. 845,798
5 Claims. (Cl. 156—79)

This invention relates to a method for making self-foaming plastic coating on sheets of materials and especially for making a sandwitch structure of plastic foam, of either flexible or rigid type, between and adhering to two parallel sheets of similar or dissimilar sheet materials. Such sheet materials would include, but are not limited to metal, paper, corrugated cardboard, textiles, plastic, glass and wood.

Heretofore it has been common practice to mix in a motor driven mixing head the chemical charges from which a plastic foam, such as a polyurethane foam, is made and to distribute the mixture over a moving horizontal surface by reciprocating transverse motion of the mixing head.

It has been proposed that a lower sheet be thus coated and then moved below a second sheet, here called the upper sheet, moving at the same speed in a path substantially parallel to the lower sheet. The expanding foam on the lower sheet eventually contacts the upper sheet. By confining the further expansion of the foam with backing plates and side boards the continuing chemical reaction in the foam generates a pressure in the foam which forces the foam into intimate contact with the two sheets. This method has serious disadvantages; for example, the rising foam develops a skin on its free surface which skin has relatively poor adhesion to other materials it contacts and consequently appreciable pressure must be developed in the foam to obtain satisfactory adhesion to other materials. Where fabrics are being coated, the required pressure is usually sufficient to force the foam through the fabrics and blemish the face of the fabric opposite the face being coated. Also this pressure increases the density of the foam above that obtained with a substantially free blown foam and is therefore wasteful of materials for those end uses where a low density foam is satisfactory.

Another serious disadvantage is that the traversing of the mixing head requires that the mixing head travel about 3 feet laterally for every 3 inches of forward travel of the sheet material being coated. Production in practical quantities requires machines running at least 300 feet per minute and it is not practical to drive a mixing head with reciprocating motion at speeds of 3600 feet per minute.

In accordance with the present invention one side each of two sheets of material are coated with a preselected amount of chemically reactive self-foaming plastic forming chemical immediately after the chemicals are mixed and while the viscosity of the mixture is still low. The two sheets of material with coated surfaces facing are then moved parallel to each other but spaced apart while the mixed chemicals react and each coating of foam expands until ultimately the foam on the upper sheet contacts the foam on the lower sheet and they unite. The compatability of one film of nascent foam with another is so great that perfect adhesion is obtained on contact without any significant pressure being required.

The coating of mixed chemicals on reacting and foaming expand to a volume of foam approximately 30 times the thickness of the coating of unfoamed chemicals. When producing extremely thin coatings of urethane foam, about 1/16 in. on each of the two sheet materials, the metered thickness of each coating of the chemical charges before foaming is about .002 in. The use of doctor blades or other scraping surfaces would be unsatisfactory by reason of the peculiar viscosity, adhesive and aging characteristics of urethane forming chemicals. In certain embodiments of the present invention, the sheets are passed through a special metering arrangement adapted to apply thin films of foam forming chemicals having a short pot life. In certain embodiments of the invention, preheating of the sheets and/or supplementary heat sources in close proximity to the coating are employed effectively to raise the temperature and to induce very satisfactory foaming of very thin urethane coatings. The heaters used are preferably of the radiant infra red type. In certain embodiments of the invention when coating very thin sheets of material the exothermic heat generated in such thin coatings is more effectively utilized if after passing under the metering roll the coating on the upper sheet and the coating on the lower sheet are allowed to remain in contact with each other and the spacing between the sheet materials is allowed to increase as determined by the free rising foam with the upper sheet in effect floating on the rising foam. As the angular deviation from parallelism with the lower sheet is very small there is a negligible force component normal to the plane of the sheet materials contributed by any tension that may exist in the upper sheet to pulling rolls or other means for moving the sheet materials.

In certain embodiments of the invention the sheet materials being coated are heated to accelerate the reaction of the mixed chemicals and to bring about more rapid generation of exothermic heat which, together with the applied heat induces a more satisfactory foam forming reaction of the mixed chemicals. This may be accomplished by heating the sheet materials or the chemical charges, or both, before coating or after coating or both before and after coating.

The sheet materials being coated may be rigid or flexible. If the finished product must conform to very precise dimensions, then obviously the separation of the sheet materials must be constrained to a suitable dimension in the final stages of the chemical reaction so that predetermined overall thickness may be achieved; however, this is mentioned only for convenience of operation, and is not a part of this invention.

In accordance with this invention, the final foam thickness will normally be controlled by regulating the formulation of the chemical charges, the degree of mixing in mixing head, the thickness of coatings applied to each sheet, and the temperature of chemical charges and the temperature of the sheet materials before and after coating and the temperature of the coatings. As there is very little pressure developed in the foam in accordance with this invention, there is normally no need for side plates to confine the flow of foam from between the sheet materials at the edges of the sheets. In special cases where extreme dimensional uniformity is required a filler strip having the thickness desired for the finished foam may be inserted along the edges of the sheets moving with the sheets while the foam is in a flowable state. Other means common to the art may be used to accomplish this purpose when required. In certain embodiments of the invention involving thin sandwich structures, the side edges of the upper and lower sheet materials may be folded so that folded edges overlap and provide side walls to restrict movement of chemicals and foam.

In some embodiments of the invention, the urethane foam adhering between two sheets of material may be split to form two single sheets of material each having one side coated with urethane foam. In accordance with certain embodiments of this invention substantial savings in material costs may be effected by adjusting the metering plates to apply coatings to the sheet materials in stripes with substantially uncoated areas between stripe coatings. This arrangement produces foam strips with air spaces between strips. Sandwich panels having strips of foam possess some of the advantages but few of the disadvantages of sandwich panels having a continuous coating of foam, in particular, sandwiches of strips of foam have physical characteristics similar to those obtained with a continuous coating of foam of much lower density.

The invention further resides in features of construction, combination and arrangement hereafter described and claimed. For a more detailed understanding of the invention and for illustration of embodiments thereof, reference is made to the accompanying drawings FIGURES 1 to 12 in which, although shown with the sheet materials moving in a horizontal plane, it is to be understood that the method of this invention is equally satisfactory when all or part of path of the sheet materials and coatings are in a vertical plane.

FIG. 2 illustrates that portion of the process in which the sheets of material pass through the metering heads to be coated with chemical mixtures, and the chemicals react to form two foam layers which grow into each other and are merged into the foam portion of the sandwich structure.

FIG. 3 is a cross-sectional view of a modification of the apparatus adapted to support the upper sheet by spacing members positioned as endless belts at the edges of the sheet.

FIG. 4 is a cross-sectional view of a pair of vacuum plates maintained in sliding contact with the upper and lower sheets of material by the urging of the vacuum and atmospheric air pressure.

FIG. 5 is a perspective view of a portion of the vacuum plate maintained in sliding engagement with a sheet of material.

FIG. 6 is a cross-sectional view of a portion of a metering head adjusted to produce strips of foam instead of a continuous foam core for a sandwich structure.

FIG. 7 is a cut away perspective view of a sandwich structure produced by the metering head adjustment of FIG. 6.

FIG. 8 is a perspective view of a modification of the method of the present invention in which the two sheets of material are spaced apart a predetermined amount and thereafter the two sheets are separated so that the foams grow separately until they merge with each other.

FIG. 8a is a perspective view of a reservoir employed in the modification shown in FIG. 8.

FIGS. 9, 10, 11 and 12 are concerned with modifications of the method in which the edges of the sheet material are folded to constrain the flow of the chemicals subsequent to their deposition onto the sheet material but prior to their setting into non-flowing plastic foam.

FIG. 9 is a perspective view of an apparatus in which the spacing of pressure rollers employed at the metering head may be adjusted.

FIG. 10 is a perspective view of the unfolding of the upper and lower sheets of material to form side edges constraining the flow of the chemical mixture undergoing the foaming reaction.

FIG. 11 is a cross-sectional view of a foam sandwich structure prepared by the folding method of FIG. 10.

FIG. 12 is a cross-sectional view of a modification of the folding method for constraining the flow of the chemicals undergoing the foaming reaction.

Figure 1:
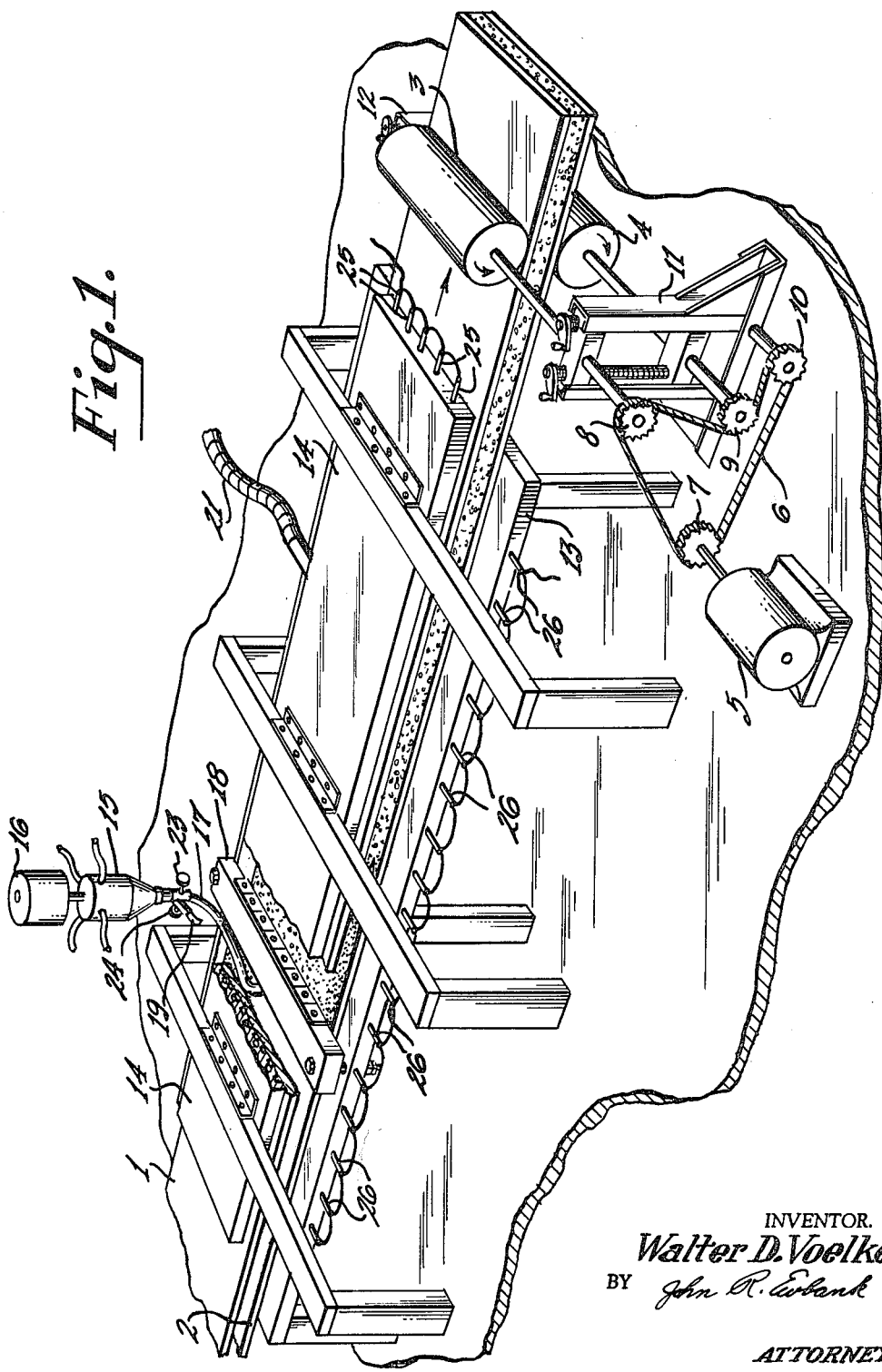
FIG. 1 is a perspective view of apparatus in which sheets of material and foam-forming chemicals are converted into a sandwich structure comprising a plastic foam core with faces of sheet material by the use of the method of certain embodiments of the invention.

In one embodiment of this invention illustrated in FIGURE 1 an upper sheet material 1 and a lower sheet material 2 are caused to move in substantially parallel paths by a pair of power rollers 3 and 4 which are driven by motor 5 through roller chain 6 and sprocket wheels 7, 8, 9 and 10, the position of said rollers being adjustable by screw members 11 and 12 until adequate pressure is obtained between the rolls. The lower sheet material 2 is supported on a slide plate 13. The upper sheet material 1 is held by vacuum against a rigid fixed vacuum plate 14, which has a plurality of recesses on the underside as shown in FIGURES 4 and 5. A partial vacuum is created in the recesses of the vacuum plate 14 when upper sheet material 1 is close to it, inasmuch as a hose 21 connects the vacuum plate 14 to a vacuum pump or other low pressure maintaining device. By this special arrangement upper sheet material 1 is supported while still being free to slide when pulling forces are exerted by the power rolls 3 and 4.

Polyurethane foam may be prepared by mixing—

| | Parts by weight |
|---|---|
| Toluenediisocyanate | 82.0 |
| Tetraethyleneglycol | 100.0 |
| Water | 2.9 |
| Triethylenediamine | 0.4 |

Numerous other formulations are also suitable for preparing polyurethane foams. Phenolic foams prepared from normally liquid mixtures comprising gas-generating and foam generating components have also been described in technical literature. Other varieties of liquid mixtures which react to form plastic foams as a result of the evolution of a gas during the increase in the molecular weight of the plastic require engineering methods and apparatus substantially the same as employed with polyurethane foam and all such self-foaming plastics are herein embraced within the phrases relating to the conversion of liquids to plastic foams.

The chemicals are delivered to a mixing head 15 in proper proportions by gear pumps or other metering devices and are then mixed. Power to drive the agitator in the mixing head is supplied by a motor 16. The mixed chemicals are fed from the mixing head 15 into a hose 17, preferably constructed of polytetrafluoroethylene, connecting to a metering unit 18 containing a reservoir 31 (FIGURE 2) with a dispensing section having adjustable plates 32 (FIGURE 2) for changing the opening between 32 and the sheet material being coated and thereby controlling the thickness of the coating applied to the lower sheet material 2. Similarly a hose 19 carries the mixed chemicals from the mixing head 15 to a metering unit 20 similar to 18 but arranged to coat the upper sheet 1 as shown in FIGURE 2. Valves 23 and 24 are adjustable and regulate the flow of the mixed chemicals through hoses 17 and 19 respectively.

Electrical heating elements 25 are located in vacuum plate 14 for heating upper sheet 1 and its coating of chemicals. Electrical heating elements 26 are located in slide plate 13 for heating lower sheet 2 and its coating of chemicals. These heating elements desirably are connected with thermostats and controls so that selected temperatures can be obtained at various locations in 14 and 13. A heating element may be located in close proximity to the coatings of mixed chemicals after the coated sheet material passes from the adjustable plates 32 but before the coatings have united. Thermostatically controlled heating elements of the conducting type, radiant heat type or other types of heaters desirably are used to heat sheet materials 1 and 2 and chemicals before coating or after coating or both.

Although the sheet material generally slides satisfactorily along plates 13 and 14, it is obvious that certain modifications are possible, such as the provision of endless belts so that a belt is interposed between the sheet material and its supporting plate. In such an alternate form, a continuous closed loop power driven belt can be located between the slide plate 13 and the lower sheet material 2, said belt operating between pulleys at each end one of which is power driven; and similarly a continuous belt can be located between the vacuum plate 14 and upper sheet material 1, said belt being of any porous material, examples being open weave canvas belt or perforated rubber coated belting, said belt operating between pulleys at each end of the closed loop, one of which is power driven at a controlled speed so that the two belts transport sheet materials 1 and 2 at the same speed.

In another embodiment the vacuum plate 14 with vacuum recesses is omitted, and its function is accomplished by spacers 27 and 28 in FIGURE 3 which space upper sheet 1 from lower sheet 2. The spacers 27 and 28 may be continuous belts with pulleys at each end, said spacers supporting sheet materials 1 and 2 from near the adjustable plates 32 of units 18 and 20 up to within about one foot of the power rollers 3 and 4. The sheet materials before reaching 18 and 20 are preferably supported on rollers located under each sheet. If desired, pulleys 29 and 30 and their opposite counterpart, not shown, may be power operated so that the belts are driven at the same speed as the sheet materials 1 and 2, or the pulleys may be free turning and the spacing belt carried along by friction contact with sheet materials 1 and 2. Upper sheet material 1 may be free to float on the rising foam should the foam thickness exceed the separation provided by the spacer belts.

The metering heads 18 and 20 have adjusting plates 32 which may be set as shown in FIGURE 6 to deposit merely stripes or strips of coatings on upper sheet material 1 and lower sheet material 2 thus only partially coating these sheet materials with the mixed chemicals. When the stripes on 1 and 2 are positioned opposite to each other, foam is produced in strips 61, as shown in FIGURE 7. This is very advantageous in reducing the quantity and the cost of the foam required to obtain a predetermined spacing between sheets where a very light density foam is satisfactory.

Another embodiment of this invention is illustrated in FIGURE 8. This is particularly adaptable to very thin coatings on flexible sheet materials. The upper sheet material here designated 33 and the lower sheet material here designated 34 are simultaneously wetted in passing reservoir 35 which is filled, or partially filled through hose 36 with a liquid chemical mixture adapted to react to form a plastic foam. Sighting holes 42 and 43 (FIGURE 8a) are desirably provided in opposite ends of the reservoir 35. If desired, the level of mixed chemicals may be controlled by sighting through these holes 42 and 43 with a light reacting on a photocell at the opposite end to actuate a control valve 39 in line 36 to reduce the flow when the level is too high and to increase the flow when the level is too low. A predetermined spacial relationship between coating-metering plates 37 and 38 effectively controls the thickness of the coating when operating with sheet materials of uniform thickness. Recessed vacuum plates 40 and 41, quite similar to vacuum plate 14 in FIGURE 1, have hose connections 44 and 45 to a vacuum pump. These vacuum plates are so located that after the flexible sheet materials 33 and 34 have been coated to a preselected thickness, and as the sheet materials advance toward the vacuum plates, the coating separates, whereby the coatings on each of these sheets react to generate foam until the foams unite. Electrical heating elements 46 and 62 may be located on the uncoated sides of the sheet materials 33 and 34 or electrical heating elements 62 may be located between the coated faces of sheet materials 33 and 34, or both. The reservoir 35 is desirably shaped to conform to the angle of the sheet materials 33 and 34 as they approach the coating-metering plates 37 and 38 as shown in FIGURE 8.

Another embodiment of this invention illustrated in FIGURE 9 is particularly suitable for producing thin coatings of foam on flexible sheet materials. Flexible sheet materials to be coated 47 and 48 are power-actuated through the apparatus and are fed from rolls 65 and 66 and pass on opposite surfaces of a reservoir 51 which is kept filled under a slight pressure with mixed chemicals supplied through hose connection 52. In the reservoir 51, a pressure such as 0.1 pound per square inch has been found to be satisfactory in some applications. The flexible sheets 47 and 48 are wetted with the foam-forming chemicals as they pass over and under 51 and then pass between coating-metering roller 49 and back-up plate 67. The spacing between the roller 49 and back-up plate 67 is adjustable through the operation of handwheels 53 and 54 and screws 50 and 55 and a similar set of handwheels and screws (not shown) at the opposite end of roller 49, and the thickness of the coating between sheets 47 and 48 is adjusted to a preselected thickness. As the sheets 47 and 48 move toward the discharge end of the apparatus, they remain in substantially the same relative position as when passing under the coating-metering roll 49 until such time as the chemical reaction induces the chemicals to foam at which time the thickness of the coating increases and the spacing between sheets 47 and 48, which are in effect in unconstrained contact with the foam, increases by the same amount. An electrical heating element may be located in close proximity to the uncoated surface of sheet 47 and an electrical heating element may be located in close proximity to the uncoated surface of sheet 48 to heat the sheets and the chemicals and to supplement the exothermic heat of the chemical reaction. The edges 56, 56 of sheets 47 and the edges 57, 57 of sheet 48 desirably are folded as shown in FIGURE 10 and FIGURE 11. These edges of flat sheet material may be bent by folding guides after passing under the coating-metering roller. In the form illustrated in FIGURE 10, the sheets 47 and 48 have had the edges creased prior to winding on rolls 65 and 66. After passing the reservoir 51, the creased sheets 47 and 48 pass under the coating-metering roller and then rub against pins 71, 71 and 72, 72 (FIGURE 9) which bend the edges 56, 56 and 57, 57 perpendicular to the plane of 47 and 48 as shown in FIGURE 10. In FIGURE 12 there is shown an alternate type of creasing and folding of sheets 58 and 59. If desired the overlapping portions of the edges may be kept in intimate contact at all times by spring loaded sliding plates along each edge thereby preventing any leakage of foam at the edges of sheets 58 and 59 even if appreciable pressure is generated in the foam materials.

After the sandwich structure has been prepared, the foam core can be split to provide two sheets of material with foam coatings on one side.

Although certain embodiments have been given by way of example and illustration it is obvious that various modifications of the structures and/or methods may be made without departing from the spirit of the invention as defined in the appended claims. For example, equivalent elements and steps may be substituted for those described, parts may be reversed and various features may be used independently of the use of other features, all without departing from the spirit of the invention.

The invention claimed is:

1. In the method of producing a sandwich structure comprising a pair of facing sheets and intermediate core of plastic foam derived from a mixture of synthetic resin foam-forming chemicals interacting to produce a gas which causes the mixture to expand to form a plastic foam, the improvement which comprises:

applying to oppositely disposed regions on opposing surfaces of each of two advancing facing sheets a predetermined quantity of a mixture of synthetic resin foam-forming chemicals to coat at least a major portion of each of said surfaces therewith;

advancing said facing sheets with the coated surfaces spaced from and facing each other at a preselected distance through a heated reaction zone to effect chemical reaction of the synthetic resin foam-forming chemicals and expand the respective coatings towards each other into uniting relationship; and advancing the sandwich structure formed thereby through a second heated zone to effect foam curing and thence to a product withdrawal zone.

2. The method of claim 1 further comprising the step of folding into overlapping relationship the border portions of each facing sheet immediately subsequent to the application of the foam-forming chemicals so as to compress and degas the reacting chemicals coating said portions and adhesively bond the said portions together.

3. The method of claim 1 wherein the facing sheets are composed of rigid sheet material.

4. The method of claim 1 wherein the facing sheets are composed of flexible sheet material.

5. The method of claim 1 wherein the foam is a polyurethane foam.

References Cited by the Examiner

UNITED STATES PATENTS

| 2,762,738 | 9/56 | Teale | 154—87 |
| 2,841,205 | 7/58 | Bird | 154—100 XR |
| 2,866,730 | 12/58 | Potchen et al. | 154—100 |
| 2,985,219 | 5/61 | Summerfield | 154—87 XR |
| 3,061,475 | 10/62 | Wallace | 156—78 |

FOREIGN PATENTS

| 842,267 | 9/52 | Germany. |
| 548,684 | 9/56 | Italy. |

EARL M. BERGERT, *Primary Examiner.*

ALEXANDER WYMAN, CARL F. KRAFT,
*Examiners.*